Dec. 8, 1942.   C. W. MacMILLAN   2,304,648
VEHICLE RUNWAY SUPPORT
Original Filed Jan. 16, 1941
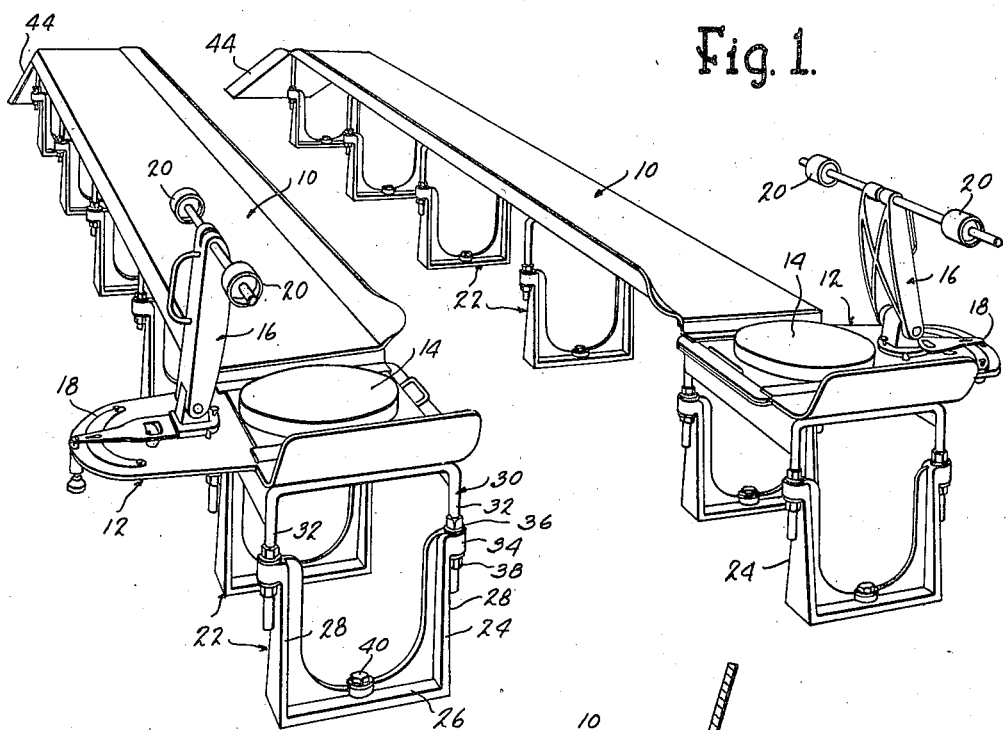
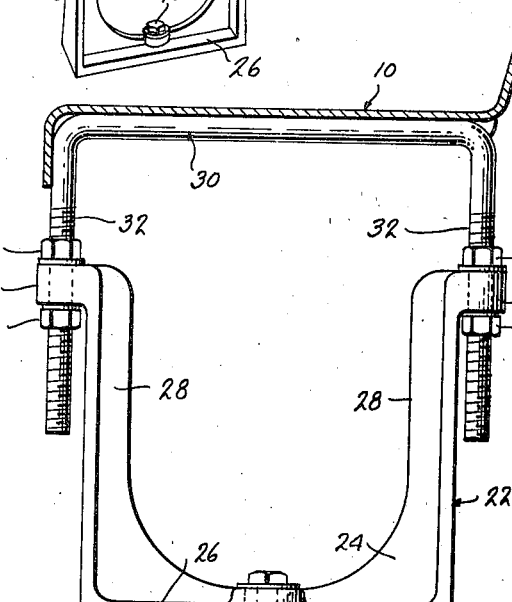
INVENTOR.
Charles W. MacMillan
BY Parker and Burton
Attorneys Patented Dec. 8, 1942

2,304,648

UNITED STATES PATENT OFFICE 2,304,648

VEHICLE RUNWAY SUPPORT

Charles W. MacMillan, Jackson, Mich., assignor to Hinckley-Myers Company, Jackson, Mich., a corporation of Michigan Original application January 16, 1941, Serial No. 374,623. Divided and this application May 29, 1941, Serial No. 395,835

2 Claims. (Cl. 104—124)

This invention relates to vehicle runway supports particularly adaptable for apparatus for checking wheel alignment. This application is a division of my copending application for patent, Serial No. 374,623, filed January 16, 1941.

An important object of this invention is to provide an improved form of vehicle runway structure which is particularly adapted for use in connection with wheel alignment apparatus. An important feature of this invention is the novel provision for adjusting the runway in order to level the runway irrespective of its support and to hold the runway firmly in adjusted position. The parts of the runway structure are so formed that they may be quickly and easily assembled and immovably secured in place.

Various other objects, advantages and meritorious features of this invention will become more fully apparent from the following specification, appended claims and accompanying drawing, wherein:

Figure 1 is a perspective view of a runway structure embodying the present invention showing its association with wheel alignment testing devices, and Fig. 2 is a view in elevation of one of the supports for the runways.

Although the runway structure is particularly adapted to apparatus for checking wheel alignment it is not necessarily limited to such use, and it is understood the invention is capable of other uses. The runway structure herein described is associated with apparatus for checking wheel alignment characteristics described and claimed in my aforesaid application.

Referring in detail to the drawing, two runways 10—10 are arranged in spaced parallel relationship at such a distance apart to receive and support the wheels of an automobile. At the forward end of each runway is a gauge unit 12 for determining certain characteristics of wheel alignment. Generally each unit comprises a turntable 14 supported on an extension of the runway, a movable wheel engaging member 16, and scale means 18 for indicating the amount of turning movement of the wheel on the turntable. Carried by the member 16 are spaced elements 20 adapted to engage the sides of the wheel on the turntable. Associated with the scale means 18 is a device for determining the toe-in of the vehicle wheels. For a detail explanation of this apparatus, reference is made to my aforesaid application.

In apparatus of this character it is desirable if not essential in careful measurements to have the vehicle supported in level condition. Since most floors in automobile service stations and the like are unlevel or irregular in formation, it is desirable to provide a level support such as an elevated runway of the type illustrated. This also raises the automobile above the floor and renders the underparts of the vehicle more accessible. It is the purpose of the present invention to provide supporting means for the runways 10—10 which enables the runways to be quickly mounted upon and fixed to a floor or any other suitable foundation in level condition.

The runways 10—10 as is apparent from the drawing are supported in elevated position by a series of supports, generally indicated at 22, arranged in spaced apart relation below each runway. The supports are similar to one another and the description of one will apply to the other. Each support 22 comprises a base or floor engaging member 24 of general U-shaped configuration. This member is here shown supported on the floor with the closed or base end 26 thereof in engagement with the floor and the arms 28—28 extending in upright manner from the floor. Surmounting member 24, is a second runway engaging member 30 of general U-shape configuration. This last U-shaped member is inverted and its closed end is secured in engagement with the runway.

Preferably, as illustrated, the runway engaging member 30 is formed by a single round rod bent twice into the form of a U. The arms 32—32 of the rod extend downwardly from the runway in such a spaced relation to one another and the arms 28—28 of the floor engaging member 24 that the upper member is supported by the lower one. As shown, the arms 32—32 are spaced wider apart than arms 28—28 and when assembled extend past the outside portions of the latter. The arms 32—32 of the rod are threaded for most of their length as shown. The middle or base portion of the rod is attached in any desirable way to the bottom side of the runway such as by welding.

To adjustably secure the two U-shaped members together, one member, in this instance the lower bracket 24, is provided with lateral projections or bosses 34, here shown as disposed on the ends of the arms 28 and arranged in the path of the arms 32—32 of the rod 30. Each boss 34 is provided with a vertical hole opening through the top and bottom side thereof and of a size to snugly receive an arm 28 of the rod. In assembled condition, the arms 32—32 extend through the holes in the bosses and project from the bottom side thereof.

Before the arms are inserted into the holes of the bosses at least one nut 36 is threaded thereon. The arms 32—32 are then fitted into the holes in the bosses and allowed to project from the bottom sides. Nuts 38 are then threaded on the arms. It is preferred to use washers between the nuts and the bosses and in the assembly operation they are fitted on the arms of the rod at the proper time to be disposed between these elements.

The higher nuts 36 on the arms of the rod 30 function to adjust the height of the runway section immediately thereabove from the floor. The position of these nuts on the arms determine this height. After this has been set, the nuts 38 are tightened home. These nuts function to secure the rod 30 in adjusted position and to hold the runway down. Thus similar means in the form of nuts is provided for both adjusting the height of the runway and holding the same down firmly to the floor.

The base portion of each floor engaging member 24 is flattened for direct bearing on the floor. Each member 24 is securely attached to the floor by bolts or any suitable means depending on the type of floor. In the present instance it is preferred to use bolt means especially when the floor is of concrete or the like. The base portion of member 24 is free for this purpose. One bolt for each member is sufficient, although more may be used if desired. As shown, a lag bolt 40 is preferred. The head of the bolt bears on the upper side of the base portion in accessible position and its shank extends downwardly through a hole provided in the base portion of the member. Any suitable means such as an expansion nut 42 may be used on the end of the bolt to lock the member 24 to the floor.

When the wheel aligning equipment illustrated is assembled, the extensions or sections of the runway carrying the wheel alignment testing gauges 12—12 are first installed in position. The supports 22 for these sections are adjusted until the top of the turntable is at a prescribed height from the floor. After certain adjustments are made to the gauge units described in my aforesaid application, the lag or anchor bolts 40 for these supports are installed and screwed into the expanders, but left in slightly loose condition for any adjusting that may be necessary.

After further adjustment to the gauge units 12, the runways 10—10 are set into position in line with the turntables. Any suitable means may be employed for registering the runways in proper alignment with the testing head supports while adjusting the runways. Expansion bolts 40 are inserted to fasten the brackets 24 to the floor but are preferably kept loose in order that adjustment may be made as the installation proceeds. The nuts 36 on each support should be adjusted until the runways 10 are level along their length and with each other and the turntables. When level conditions are established the bolts 40 and the nuts 38 are tightened in place to secure the apparatus firmly to the floor. Inclined ramps 44 may then be attached to the rear ends of the runways 10—10 up which an automobile is driven to reach the level sections of the runway.

What I claim:

1. A vehicle runway structure comprising, in combination, a runway member, a generally U-shaped member supported with its closed end secured to a floor and with its arms projecting upwardly therefrom and having laterally outwardly bent vertically apertured end portions, a second U-shaped member surmounting said first member in inverted position with its closed end secured to and extending transversely across the underside of the runway and with its arms threaded and projecting downwardly along and outside the arms of the first U-shaped member and through the apertures therein, and nuts on said threaded arms both above and below said apertured end portions adjustably securing the two U-shaped members together.

2. A vehicle runway structure comprising, in combination, a runway member, a generally U-shaped bracket having a flat bottom portion mounted on a floor to support the arms projecting upright therefrom, a rod bent into the form of a U having its intermediate portion secured to the underside of the runway and the arms thereof extending downwardly therefrom alongside and outside of the upwardly extending arms of the bracket, bosses on the arms of said bracket projecting outwardly laterally and each provided with a vertical hole therethrough, the arms of said rod being threaded and extending downwardly through the holes in said bosses to project therebelow, a nut threaded on each arm of the rod above each boss and a nut threaded on each arm of the rod below each boss, said nuts adapted to be tightened into ingagement with the bosses to adjustably secure the rod to the bracket, and fastening means securing the bracket to a floor including a bolt extending through the flat bottom base portion of the bracket and having its head projecting thereabove between the arms of the bracket.

CHARLES W. MacMILLAN.